Patented Aug. 28, 1951

2,565,888

UNITED STATES PATENT OFFICE 2,565,888

DIBENZYL DIGLYCOLATE

Walter E. Scheer, Jackson Heights, N. Y., assignor to Hardesty Chemical Co., Inc., a corporation of Delaware No Drawing. Application November 13, 1946, Serial No. 709,413

1 Claim. (Cl. 260—484)

This invention relates to esters of diglycolic acid and to compositions including such esters as plasticizers for vinyl chloride polymers.

The new esters may be represented by the type formula $R^1OOC-CH_2-O-CH_2-COOR^2$ in which $R^1$ and $R^2$ represent radicals containing 4 to 12 carbon atoms and are of kind described more specifically later herein, an example of the $R^1OOC-$ and $-COOR^2$ groups being

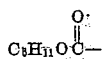

In unpublished work I have found that the bridge between the two ester groups ROOC— and —COOR should contain at least 4 carbon atoms in order to make the dibasic acid ester properly compatible with the vinyl chloride polymers. Ester of fumaric acid, for instance, in which only 2 carbon atoms are present in the bridge between the ester groups, is incompatible with the vinyl chloride polymer unless an aromatic hydrocarbon radical is present in the ester.

The introduction of oxygen into this bridge, without increasing the number of carbon atoms in it, increases the dissimilarity of chemical composition between the ester and vinyl resins. It is generally understood that in most cases increase of dissimilarity of chemical composition between a solvent compound and the dissolved substance decreases the solvent effect; and the oxygen content of vinyl chloride is zero and of the copolymers of kind used by me as alternatives is very low.

I have now found, however, that the introduction of the oxygen or ether group into this bridge at the central part of the molecule of diglycolic esters not only fails to decrease the solvent effect of the ester but actually increases such effect. The increase in solvent effect is so large that esters including only 2 carbon atoms in the bridge, as in the case of the diglycolic acid esters of the type formula, and with 4 to 12 carbon atoms in the $R^1$ and $R^2$ groups are effective solvents and plasticizers for the vinyl chloride polymers.

The effect of the introduction of oxygen is considered to be due to the increased spacing apart of the ester groups in the molecule, the effect of the introduction of an oxygen at this position being about equivalent in solvent effect to the increase caused by introducing 2 additional carbon atoms and their accompanying hydrogens.

The invention comprises the esters of the type formula given in which $R^1$ and $R^2$ represent radicals, either the same one or different ones, selected from the group consisting of alkyls and alkoxy alkyls containing 4 to 12 carbon atoms each, aryls, and alkaryls. The invention comprises also compositions in which such esters serve as plasticizing agents for vinyl chloride polymers, this term including copolymers of vinyl chloride and other vinyl compounds in which the vinyl chloride constitutes the major part, the chloride being alpha, beta, or gamma.

Examples of the vinyl polymers which are included are polyvinyl chloride alone, a copolymer of 95 parts of the vinyl chloride with 5 parts of vinyl acetate, known commercially as VNYW; a copolymer of vinyl chloride and vinyl acetate in the proportion of 85 parts of the former to 15 of the latter, known as VYHH; and a copolymer intermediate in composition between VYNW and VYHH, known as VYNS, all being grades of "Vinylite."

Examples of $R^1$ and $R^2$ of the type formula are the groups or radicals benzyl, phenyl-ethyl, hexyl, octyl, cyclohexyl, butoxyethyl, and ethoxyethyl, $R^1$ and $R^2$ representing the same one or different ones of these radicals.

Esters of the kind described give excellent plasticizing of the vinyl chloride polymers as will appear from data in the table in a following section. In spite of the presence of the ether group in the molecule and in fact because of that group, the ester is compatible with the vinyl chloride polymers and does not separate therefrom after blending with the vinyl polymer in amounts up to 55 parts or somewhat more for 100 parts of the vinyl polymer. The result is a plastic composition of satisfactory physical properties, good cold crack test, and low volatility of the plasticizer at elevated temperatures of testing, the introduction of the oxygen decreasing the volatility.

The data for the table was obtained with a composition including a blend of 100 parts of Vinylite VYNW, 2 parts of calcium stearate added as a stabilizer and a parting compound to promote separation of the mix from the equipment used to make it, and 55 parts of the plasticizer of kind shown in the first column of the table. The several blends were milled on a two-roll mill at a roll temperature of 300° to 310° F. and then shaped in a mold and held there for ten minutes under pressure at a temperature of 300° F. The molded test pieces were then chilled under pressure, the pressure released, and the pieces tested with conventional equipment and in conventional manner for determining the values of the several properties shown in the table. For control purposes there were included, in the series of mixings and subsequent tests, the same vinyl polymer with dioctyl phthalate, dibutyl sebacate and tricresyl phosphate, the most commonly used plasticizers for the vinyl chloride polymers, this term as stated including copolymers with other vinyl compounds and particularly with vinyl acetate. The results of the tests follow.

and separation of water from the organic layer in the trap.

It will be understood that the diglycolic acid requires 2 mols of a monohydric alcohol for each mol of the acid used. Preferably the alcohol is used in proportions somewhat greater than 2 mols.

| Plasticizer | Modulus, Lbs./sq. in., at 100% Elong. | Tensile Strength, # Sq. In., At Break | Elong. at Break, Per Cent | Set,[1] Per Cent | Shore Hardness | Cold Crack Temp. °F. | Volatility, per cent less in 24 hrs. @ 250° F. |
|---|---|---|---|---|---|---|---|
| 2-ethyl Hexyl Diglycolate | 810 | 2,595 | 380 | 34 | 76 | Below −80° | 8.85 |
| Dihexyl Diglycolate | 980 | 2,775 | 325 | 26 | 81 | −20° | 19.3 |
| Dibenzyl Diglycolate | 1,010 | 3,280 | 350 | 29 | 84 | −20° | 2.80 |
| Dibutoxy Ethel Diglycolate | 785 | 2,685 | 395 | 36 | 75 | −50° | 9.30 |
| Dibutyl Sebacate | 584 | 2,220 | 405 | 50 | 62 | Below −80° | 13.6 |
| Dioctyl Phthalate | 1,075 | 2,795 | 365 | 39 | 79 | Below −45° | 2.3 |
| Tricresyl Phosphate | 1,780 | 3,150 | 285 | 27 | 85 | Below 0° | 0.49 |

[1] Permanent increase in length under breaking tension.

It will be noted that the results with the diglycolic acid esters are entirely satisfactory in spite of the small number of carbon atoms in the bridge in the central part of the molecule and the introduction thereinto of the oxygen group which theoretically should increase dissimilarity to the vinyl polymer plasticized.

In making the new esters of diglycolic acid, usual esterification technique is followed.

Diglycolic acid is mixed with the alcohol selected to provide, after esterification accompanied by formation of water as the by-product, the $R^1$ and $R^2$ groups in the type formula given above. Suitably the alcohol or mixture of alcohols used is added in slight excess over the diglycolic acid, so that, after virtual completion of the esterification of the acid, there will be left a small proportion at least of the alcohols that may be removed as a foreshot during distillation of the ester. A catalyst of esterification is added, as, for example, a few tenths percent or slightly more or less of a mineral acid, such as sulfuric, hydrochloric, or phosphoric acid, on the weight of mixture of diglycolic acid and selected alcohol.

The mixture so made is then refluxed, suitably under a fractionating column communicating at the top with a down condenser and a water trap for (1) elimination of water formed during the esterification, carried out during the fractionation, and condensed, and (2) return to the reaction vessel of the water-immiscible material which collects as an upper layer in the trap.

After the reaction is virtually completed, as shown by the collection of no more water in the trap or by tests showing a substantially constant, low percentage of acid in the reaction vessel, the whole is cooled to room temperature and the remaining acid neutralized. This is accomplished by stirring in a small amount of aqueous alkali solution, such as 25% solution of sodium hydroxide in amount to give a slight pink color with phenolphthalein. The batch may be washed with water before the alkali is stirred in and also after the stirring in, to remove water soluble material.

In any case any water or aqueous solution present in the batch as a separate layer after the neutralizing is separated as by drawing off either the water layer or the ester layer.

Then the ester layer is distilled, the foreshot being discarded and distillation being then effected under vacuum.

The esterification described above is facilitated by the inclusion in the batch of a water immiscible hydrocarbon such as toluene or xylene to promote removal of water during the esterification The making of the esters will be illustrated more specifically in connection with the preparation of dihexyl and dioctyl diglycolates by the general method described.

Dihexyl diglycolate was made as follows: 456 parts of diglycolic acid, 715 parts methyl-isobutyl carbinol, 258 parts of toluene as immiscible liquid to assist in removal of water as formed during the esterification, and 2 parts of sulfuric acid as catalyst were charged into a container equipped with agitator and heating means. The whole was refluxed under a fractionation column for 12 hours, some of the vapors at the top of the column being bled off continuously to a down condenser and the condensate being delivered from the condenser to a water trap from which the organic layer was returned to the still. After the 12 hours' refluxing, the whole was cooled to room temperature, washed with 300 parts of water, then stirred with a small portion of a 25% solution of sodium hydroxide in water added in amount to give a pink reaction to phenolphthalein, and then washed again twice with 200 parts of water. The washed material was then transferred to a distilling flask connected to a fractionating column. The toluene and remaining hexyl alcohol were collected up to a temperature at the top of the column of 180° C. Vacuum was then applied. After the remainder of the hexanol was removed along with some decomposition products, there was collected 780 parts of a main fraction, consisting of the diglycolic acid diester of methyl isobutyl carbinol of formula $(CH_3)_2.CH.CH_2.CH(CH_3).OOC.CH_2.O.$
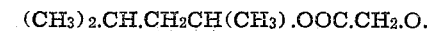
$CH_2.COO.(CH_3)CH.CH_2.CH.(CH_3)_2$
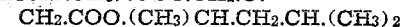

It was a water-white liquid boiling at 156° C. at approximately 5 mm.

Dioctyl diglycolate was made in similar manner except that the alcohol used in this instance was 910 parts of 2-ethyl-1-hexanol of formula $CH_3.(CH_2)_3.CH(C_2H_5).CH_2OH$. The refluxing was conducted for 8 hours. During this time 130 parts of water was separated in the trap. At the end of the period a sample removed from the still and analyzed showed substantially complete esterification of the diglycolic acid. In the final distillation, 1150 parts of the diester of the 2-ethyl-1-hexanol with diglycolic acid was collected. It boils at 192° C. at approximately 3 mm. and is a colorless liquid.

Other esters of kind represented by the type formula are made in like manner, by substituting on a mol for mol basis the selected alcohol for either the methyl isobutyl carbinol or ethyl hexyl alcohol. With these other alcohols, the preparation of the ester is effected as described, the chief fraction in the vacuum distillation being accepted as the desired ester.

When it is desired to make a mixed ester in which the $R^1$ and $R^2$ represent different ones of the radicals, then the diglycolic acid is first mixed with one of the alcohols, containing either the $R^1$ or the $R^2$ radical, in about half the amount equivalent to all the diglycolic acid and in the presence of the sulfuric acid or the like as catalyst. The alcohol so added is esterified, suitably under refluxing as described above. This gives a monoester. Then the other alcohol is added in amount approximately equivalent to the remaining half of the diglycolic acid and the reaction completed by the refluxing, washing, distillation, and vacuum distillation as described, the large intermediate fraction in the vacuum distillation being accepted. In this way there may be used as the alcohol any hexyl, heptyl or octyl alcohol; benzyl, phenylethyl or cyclohexyl alcohol of which the radical, that is, the residue representing the molecule less the hydroxyl group, is a monocyclic monovalent group of carbon and hydrogen atoms; and alkoxy alcohols of which ethoxyethanol, butoxyethanol, ethoxyethanol, and butoxybutanol are examples.

The esters made as described are saponifiable by alkalies. They are compatible with the vinyl chloride polymers to give a well plasticized vinyl plastic when used in proper amounts. Lower members of the series are liquids at ordinary temperature and water-white in color.

The proportion of the diglycolic acid esters to be used when plasticizing the vinyl chloride polymers is 20 to 85 parts for 100 parts of the vinyl polymer, all proportions here and elsewhere herein being expressed as parts by weight unless otherwise specifically stated.

In making the plastic with the vinyl polymer, the diglycolic acid ester and selected vinyl polymer, such as polyvinyl chloride or copolymer of vinyl chloride and acetate, are mixed preferably with a small amount of a parting agent and then milled as on a two-roll mill at a roll temperature of about 250° to 375° F. and preferably at about 290° to 320° F. Then the mixture is molded under pressure to the shape desired at a temperature above the softening point, as at about 300° F. The molded product is then cooled.

It will be understood also that it is intended to cover all changes and modifications of the examples of the invention herein chosen for the purpose of illustration which do not constitute departures from the spirit and scope of the invention.

What I claim is:

As a new compound, dibenzyl diglycolate.

WALTER E. SCHEER.

REFERENCES CITED

The following references are of record in the file of this patent:

UNITED STATES PATENTS

| Number | Name | Date |
|---|---|---|
| 2,120,755 | Kyrides | June 14, 1938 |
| 2,331,094 | Loder | Oct. 5, 1943 |
| 2,386,405 | Meincke | Oct. 9, 1945 |
| 2,399,285 | Muskat | Apr. 30, 1946 |